(12) United States Patent
'T Hooft et al.

(10) Patent No.: US 8,941,048 B2
(45) Date of Patent: Jan. 27, 2015

(54) PULSE SPLITTER WITH DISPERSION COMPENSATION

(75) Inventors: Gert 'T Hooft, Eindhoven (NL); Jeroen Jan Lambertus Horikx, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 312 days.

(21) Appl. No.: 13/395,899

(22) PCT Filed: Sep. 15, 2010

(86) PCT No.: PCT/IB2010/054162
§ 371 (c)(1),
(2), (4) Date: Mar. 14, 2012

(87) PCT Pub. No.: WO2011/036608
PCT Pub. Date: Mar. 31, 2011

(65) Prior Publication Data
US 2012/0168614 A1    Jul. 5, 2012

(30) Foreign Application Priority Data
Sep. 24, 2009   (EP) .................... 09171203

(51) Int. Cl.
*H01J 3/14* (2006.01)
*G02B 27/14* (2006.01)
(Continued)

(52) U.S. Cl.
CPC ............ *G02B 27/144* (2013.01); *G02B 27/106* (2013.01); *G02B 27/126* (2013.01); *H01S 3/0057* (2013.01)
USPC ....................................................... 250/216

(58) Field of Classification Search
CPC ... G02B 27/106; G02B 27/126; G02B 27/144

USPC .......................................................... 250/216
See application file for complete search history.

(56) References Cited

U.S. PATENT DOCUMENTS 5,165,080 A   11/1992   Healey
5,862,287 A    1/1999   Stock et al.
(Continued)

FOREIGN PATENT DOCUMENTS

DE    10050540    5/2002
EP     1847862   10/2007
(Continued)

OTHER PUBLICATIONS

R.L. Fork, et al., "Compression of Optical Pulses to Six Femtoseconds by Using Cubic Phase Compensation", Optics Letters, Jul. 19897, vol. 12, No. u. pp. 483-485.
(Continued)

*Primary Examiner* — Thanh Luu (57) ABSTRACT

The present invention relates to a pulse splitting device (5) adapted to receive irradiation pulses (10) with a central wavelength (1) from a pulsed irradiation source (2) and output a plurality of sub-pulses (11,12,15,17) for each incoming irradiation pulse. The received irradiation pulses and the pulse splitter (5) interacts so that a first and a second sub-pulse (11,12) are temporally separated by a first optical path length (OP1) in a first region and a second optical path length (OP2) in a second region, respectively. The first optical path length (OP1) times the group velocity dispersion (GVD1) with respect to wavelength in the first material, is balanced with the second optical path length (OP2) times the group velocity dispersion (GVD2) with respect to wavelength in the second material, so that the dispersion broadening of the first and the second sub-pulses (11,12) is substantially equal. This facilitates improved subsequent dispersion compensation by both sub-pulses.

10 Claims, 5 Drawing Sheets

(51) Int. Cl.
*G02B 27/10* (2006.01)
*G02B 27/12* (2006.01)
*H01S 3/00* (2006.01)

(56) References Cited

U.S. PATENT DOCUMENTS

2003/0189757 A1    10/2003    Spiecker
2009/0067458 A1*   3/2009     Ji et al. ............................. 372/25

FOREIGN PATENT DOCUMENTS

GB    2346453    8/2000

JP    2009070526    4/2009

OTHER PUBLICATIONS

N. Ji, et al., "High-Speed, Low-Photodamage Nonlinear Imaging Using Passive Pulse Splitters", Nature Methods, vol. 5, No. 2, Feb. 2008, pp. 197-202.

P. Schlup, et al., "Dispersion Balancing of Variable-Delay Monolithic Pulse Splitters", Applied Optics, Aug. 10, 2007, vol. 46, No. 23, pp. 5967-5973.

* cited by examiner

PULSE SPLITTER WITH DISPERSION COMPENSATION

FIELD OF THE INVENTION

The present invention relates to a pulse splitter with dispersion compensation, the pulse splitter being particularly suited for nonlinear optical imaging, especially multi-photon microscopy. The invention also relates to a corresponding optical imaging system and a corresponding method for imaging.

BACKGROUND OF THE INVENTION

Multi photon microscopy is a well-established technique in order to investigate biological tissue. It has the advantage over confocal fluorescence microscopy that it has a larger penetration depth in turbid media such as tissue, a smaller excitation load and a natural depth sectioning.

The disadvantage of non-linear imaging is the small absorption cross section of fluorophores for two photon excitation. This could be compensated by increasing the excitation power, but the increase of power is limited in practice to a damage threshold for so-called bleaching at around 10 mW average power in a submicron focus with a conventional laser system having a repetition rate of 80 MHz. The pulse energy should therefore be limited to below 1 nJ. Available laser systems, however, exhibit much larger average powers and consequently much larger pulse energies. The surplus of energy can be employed by splitting each pulse in a set of equidistant pulses with the same energy, preferably without loss of energy. By accelerating the repetition rate N-fold, one can generally:

increase the signal strength N-fold,
increase the data acquisition speed N-fold, or
reduce the photodamage probability, or
any combination thereof.

Various solutions exist for pulse splitters such as the use of Fabry-Perot etalons with two parallel, partially reflective mirrors, or the so-called optical rattler where a stack of parallel etalons is applied.

A recent monolithic pulse splitter has been disclosed by Na Ji, Jeffrey C. Magee & Eric Betzig (Nature Methods 5(2) 2008, pp 197-202 entitled *"High-speed, low-photodamage nonlinear imaging using passive pulse splitters"*). See also the corresponding US patent application US 2009/0067458, where an apparatus includes a pulsed laser source that produces a pulsed laser beam at an input repetition rate and an input pulse power, a passive pulse splitter (with two different materials interfaced with a 50% beam splitter) that receives the pulsed laser beam and outputs a signal including a plurality of sub-pulses for each input pulse of the pulsed laser beam, a sample, and a detector. The output signal has a repetition rate that is greater than the input repetition rate and the powers of each of the sub-pulses are less than the input pulse power.

The essence of the pulse splitter of Na Ji et al. is the fact that the two material layers have different refractive indices so that there is refraction at the interface with the 50% beam splitter. Materials with different refractive indices have the tendency to have different group velocity dispersions. This means that, when an ultra short pulse travels through the medium, not all optical frequencies that make up the pulse have the same velocity. Consequently, the pulse will broaden. This broadening effect is different for beams travelling through the two materials, i.e. medium 1 and medium 0. On the output ports of the pulse splitter, the pulses are mixed, resulting in alternatively more and less broadened pulses. Na Ji et al. proposes to use low dispersion materials, e.g. air and silica, to reduce the group velocity dispersion but this will only reduce the dispersion, not eliminate it, and this dispersion will also set a limit to the number of sub-pulses, N, and the available intra-pair pulse spacing time, $\Delta t$.

Hence, an improved pulse splitter device would be advantageous, and in particular a more efficient and/or reliable device would be advantageous.

SUMMARY OF THE INVENTION

It would be advantageous to achieve an improved pulse splitter. In general, the invention preferably seeks to mitigate, alleviate or eliminate one or more of the above mentioned disadvantages singly or in any combination. In particular, it may be seen as an object of the present invention to provide a pulse splitter device that solves the above mentioned problems, or other problems, of the prior art. In particular, problems related to dispersion.

This object and several other objects are obtained in a first aspect of the invention by providing a pulse splitting device adapted to receive irradiation pulses with a central wavelength ($\lambda$) from an associated pulsed irradiation source and output a plurality of sub-pulses for each incoming irradiation pulse, the pulse splitter comprising:

a first region with a first material ($m_0$) having a first refractive index ($n_0$), and a second region with a second material ($m_1$) having a second refractive index ($n_1$);

wherein the received irradiation pulses and the pulse splitter are configured for interacting so that at least a first and a second sub-pulse are temporally separated by a first optical path length (OP1) in the first region and a second optical path length (OP2) in the second region, respectively, and wherein the first optical path length (OP1) times the group velocity dispersion (GVD1) with respect to wavelength in the first material, is balanced with the second optical path length (OP2) times the group velocity dispersion (GVD2) with respect to wavelength in the second material, so that the dispersion broadening of the first and the second sub-pulses is substantially equal.

The invention is particularly, but not exclusively, advantageous for obtaining a pulse splitter where the dispersion broadening of the first and the second sub-pulse is substantially the same. It is worth mentioning the fact that substantially the same broadening of sub-pulses is obtained by the present invention because for subsequent dispersion compensation of the so-called chirp various standard techniques may then be applied for compensation of this dispersion, e.g. a pair of gratings or a set of chirped mirrors, or other techniques well-known in the field of ultra fast optics.

It may further be noted that the balancing of the first optical path length (OP1) times the group velocity dispersion (GVD1) with respect to wavelength in the first material, with the second optical path length (OP2) times the group velocity dispersion (GVD2) with respect to wavelength in the second material is not a straight-forward choice for the skilled person working with designing a pulse splitter because in order to have a sufficient compact splitter, usually a high difference in refractive index between the first and the second material is desirable while high refractive index usually also implies high group velocity dispersion, however, this is only part of the relevant design consideration according to teaching and principles of the present invention.

In the context of the present invention, the term "pulsed irradiation source" is considered to include, but not limited to, pulsed lasers suitable for multi-photon microscopy in the technical area of non-linear optical imaging, e.g. a Ti-sapphire laser with a repetition rate of 80 MHz or higher, or a fiber laser with a repetition rate of 20 MHz or higher.

In the context of the present invention, the first and/or the second material may be any kind of material transparent around the central wavelength of the irradiation source. Thus, the materials could be solids, e.g. glass, but also fluids, i.e. liquids and gasses.

The present pulse splitting device is particular in that the first and the second sub-pulse are temporally separated by the pulse splitting device, i.e. they are separated in the time domain, but they are propagating in substantially the same spatial direction after leaving the pulse splitting device. However, when the first and the second sub-pulse are propagating along the first and the second optical path, respectively, within the pulse splitter they are spatially separated.

In an embodiment, the first and the second region comprises a common interface formed by the first and the second material, and preferably the first (OP1) and the second (OP2) optical path length is separated from each other by this common interface. This may for instance be a semi-reflective or semitransparent mirror, e.g. 50%, in the common interface.

Preferably, the common interface may be a substantially plane interface, the common interface further being positioned between a pair of substantially parallel reflecting surfaces arranged for reflecting the first and the second sub-pulse toward the common interface. This could be dedicated mirrors but alternatively the difference in refractive index may be so high that complete internal reflection may perform the reflection. The common interface may preferably be parallel to the reflecting surfaces.

In a specific embodiment, the group velocity dispersion (GVD1/GVD2) with respect to wavelength in the first and/or the second material may be approximated by the second derivate of the first and/or the second refractive index, respectively, at the central wavelength. Thus, one group velocity dispersion, but not necessarily both, may be approximated. Higher order dispersion effects become more and more important, the smaller the original pulse width is, i.e. the broader the spectral content. The said second order derivates can retrieved from standard tables; so-called "M constants" for materials.

More particular, the dispersion broadening of the first and the second sub-pulses may be substantially equal by requiring that the equation $$n_1 \frac{d^2 n_1}{d\lambda^2} = n_0 \frac{d^2 n_0}{d\lambda^2}$$

is full-filled at or around the central wavelength ($\lambda$), where the first refractive index is $n_0$, and the second refractive index is $n_1$.

Preferably, the dispersion broadening may be substantially equal in a wavelength interval defined by a range of tunable central wavelengths of the associated irradiation source. Thus for instance the range may be the. 700-950 nm of a Ti:Sapphire laser but also other intervals such as 50, 100, or 150 nanometers (nm) around the central wavelength ($\lambda$) are contemplated. Alternatively, 10 20, or 30 nanometers (nm) spectral width of the central wavelength ($\lambda$) may be contemplated.

Advantageously, the first optical path length (OP1) times the group velocity dispersion with respect to wavelength in the first material, may be balanced with the second optical path length (OP2) times the group velocity dispersion with respect to wavelength in the second material, so that the ratio of the broadest pulse width of the first and the second sub-pulses with respect to the smallest pulse width of the first and the second sub-pulses is within a factor of 2, 1.6, 1.3 or 1.1. The width may be measured as full-width half maximum (FWHM) of for instance a Gaussian type beam. Whatever the definition of the pulse width is, it should be the same for the first and second sub-pulses, and the result of the present invention is that the broadening induced by pulse splitting device is substantially the same.

In a second aspect, the present invention relates to an optical system for imaging an object, the system comprising:
 a pulsed irradiation source adapted to emit irradiation pulses with a central wavelength ($\lambda$),
 a pulse splitter according to the first aspect, and
 an optical detector capable of detecting reflected radiation from the said object.

Thus, the present invention may be implemented in connection with various optical imaging techniques such as femto second lasers, multi-photon microscopy, confocal microscopy, etc.

Preferably, the optical system may further comprise a first dispersion compensation unit with a pair of optical components (P1, P2), and a higher-order dispersion compensation device (210), the said device being adapted to cooperate with the pair of optical components (P1, P2) arranged to compensate first-order dispersion by separating different wavelengths spatially, the compensation device having the form of a phase plate, wherein the phase change for each wavelength is adjusted by designing the height at the corresponding position of the plate so as to substantially compensate for higher-order dispersion.

In a third aspect, the present invention relates to a method for performing optical imaging of an object, the method comprises:
 providing a pulse splitting device adapted to receive irradiation pulses with a central wavelength ($\lambda$) from a pulsed irradiation source and output a plurality of sub-pulses for each incoming irradiation pulse, the pulse splitter comprising
 a first region with a first material ($m_0$) having a first refractive index ($n_0$), and a second region with a second material ($m_1$) having a second refractive index ($n_1$); and
 configuring the received irradiation pulses and the pulse splitter for interacting so that at least a first and a second sub-pulse are temporally separated by a first optical path length (OP1) in the first region and a second optical path length (OP2) in the second region, respectively,
 wherein the first optical path length (OP1) times the group velocity dispersion (GVD1) with respect to wavelength in the first material, is balanced with the second optical path length (OP2) times the group velocity dispersion (GVD2) with respect to wavelength in the second material, so that the dispersion broadening of the first and the second sub-pulses is substantially equal.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
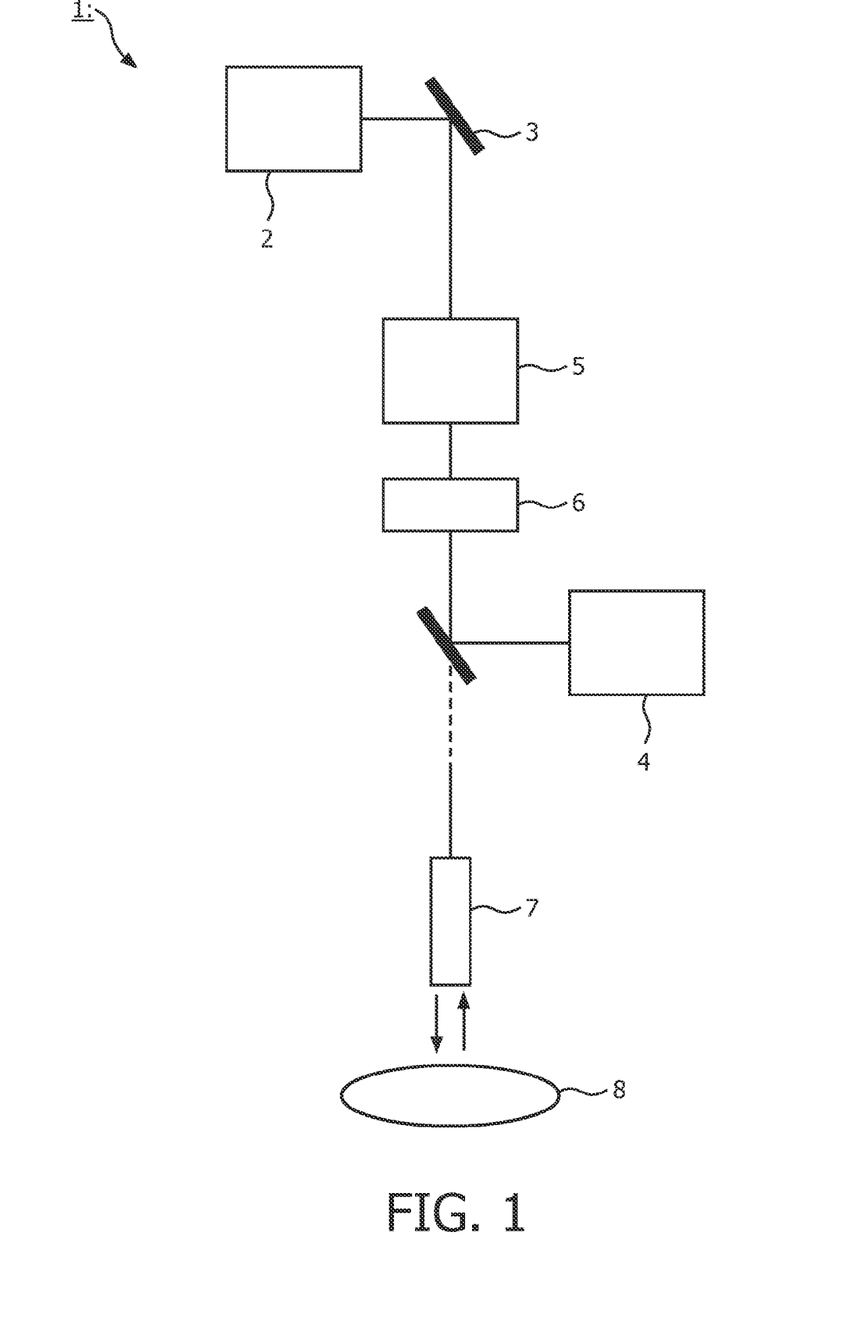
FIG. 1 is a schematic drawing of a system for optical imaging of an object according to the present invention.

FIG. 1 is a schematic drawing of a system 1 for optical imaging of an object 8, e.g. tissue, according to the present invention. The system 1 comprises a pulsed irradiation source 2 adapted to emit irradiation pulses with a central wavelength $\lambda$. The source 2 is optically connected, i.e. through mirror 3 or similar devices, with a pulse splitter 5 according to the present invention. After the pulse splitting device 5, the sub-pulses (not shown in this Figure) are transmitted through a dispersion compensation device 6 (cf. FIG. 6 below) and via manipulating optics 7, e.g. focusing lenses and/or catheter arms, irradiated on the object 8. Radiation reflected from the object 8 (schematically indicated with the double arrows) is then detected in suitable optical detector 4 capable of detecting reflected radiation from the said object 8. In particular, the invention is advantageous for applications with femto second lasers in multi-photon microscopy of various kind of biological tissues, but other applications are also readily within reach of the skilled person, such as a compact fiber scanner for (bio) medical imaging.

Figure 2:
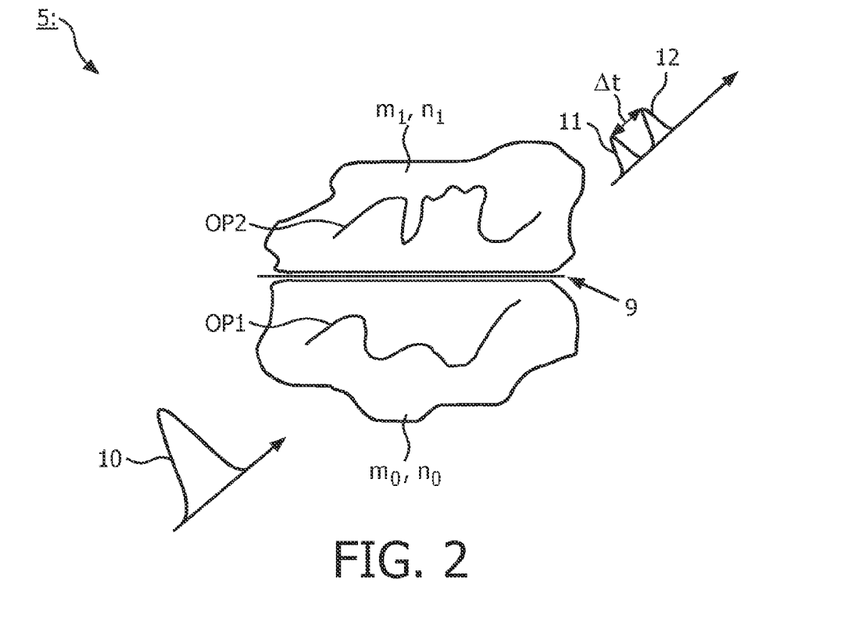
FIG. 2 is a schematic drawing of a pulse splitting device according to the present invention.

FIG. 2 is a schematic drawing of a pulse splitting device 5 according to the present invention, the pulse splitting device 5 being adapted to receive irradiation pulses with a central wavelength ($\lambda$) from an associated pulsed irradiation source 2 and output a plurality of sub-pulses 11 and 12 for each incoming irradiation pulse.

The pulse splitter comprises a first region with a first material $m_0$ having a first refractive index $n_0$, and a second region with a second material $m_1$ having a second refractive index $n_1$. The first and the second refractive indexes are different to provide a refraction of the light in the interface 9. In particular, the first and second region comprises a common interface 9 formed by the first and the second material, where the first OP1 and the second OP2 optical path length is separated from each other by the common interface. The interface 9 is preferably a 50% semi-transparent mirror or similar for splitting the pulse 10 in to two sub-pulse.

The received irradiation pulses and the pulse splitter 5 are configured for interacting so that at least a first 11 and a second 12 sub-pulses and are temporally separated by a first optical path length OP1 in the first region and a second optical path length OP2 in the second region, respectively, as schematically indicated in FIG. 2 for the intra-pair pulse spacing time, $\Delta t$. For further details about this temporal separation, the skilled reader is referred to US patent application US 2009/0067458, which is hereby incorporated by references in entirety.

The present invention is particular in that the first optical path length OP1 times the group velocity dispersion GVD1 with respect to wavelength in the first material, is balanced with the second optical path length OP2 times the group velocity dispersion GVD2 with respect to wavelength in the second material, so that the dispersion broadening of the first and the second sub-pulses 10 and 11 is substantially equal; thus, $$OP1 \times GVD1 = OP2 \times GVD2 \text{ or } OP1 \times GVD1 \approx OP2 \times GVD2 \quad (1)$$

is the constraint which should be full-filled around the central wavelength ($\lambda$).

Figure 3:
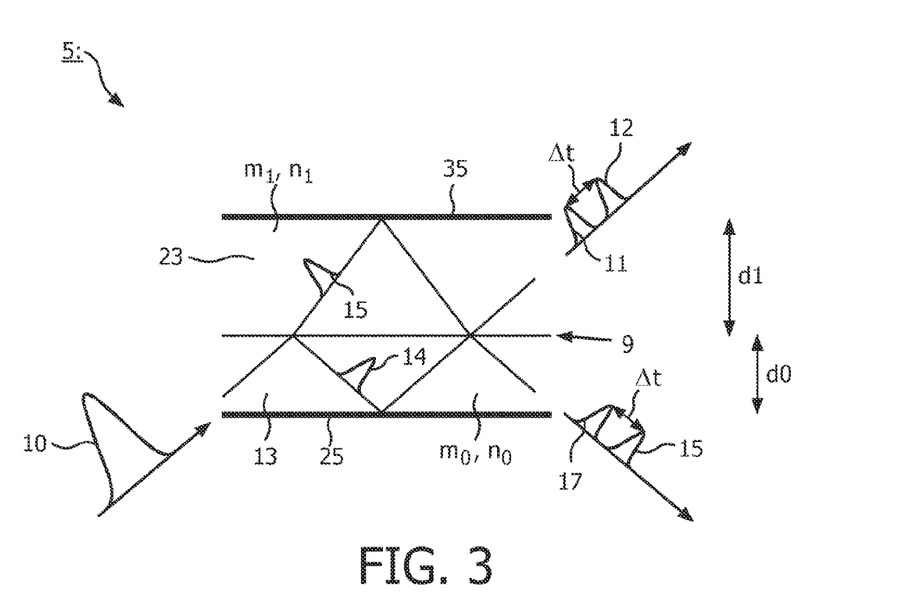
FIG. 3 is another schematic drawing of pulse splitting device according to the present invention.

FIG. 3 is another schematic drawing of pulse splitting device 5 according to the present invention. The device of this figure is similar to the device of FIG. 2, but here the optical paths OP1 and OP2 are specifically implemented and shown by a first region 13 and a second region 23 separated by interface 9, the common interface 9 being a substantially plane interface, the common interface further being positioned between a pair of substantially parallel reflecting surfaces 25 and 35 (e.g. mirrors) arranged for reflecting the sub-pulse 14 and 15 toward the common interface 9 as schematically indicated in FIG. 3. Upon impinging on the interface 9, the sub-pulses 14 and 15 will both be divided into two further sub-pulses resulting in one upper branch of temporally separated sub-pulses 11 and 12, and lower branch of temporally separated sub-pulses 15 and 17 as indicated in FIG. 3. In each branch, the sub-pulses are spatially overlapping in order to facilitate further optical processing of the sub-pulses as indicated in FIG. 1.

It can be shown that sub-pulses 11 and 12 emerge in the same direction will be spatially overlapping if the incident angle of the pulse 10, $\theta_0$, satisfies the following condition:

$$\cos(\theta_0) = \frac{d_0}{n_0} \sqrt{\frac{n_1^2 - n_0^2}{d_1^2 - d_0^2}}. \quad (2)$$

Where $d_0$ is the thickness of the first material, and $d_1$ the thickness of the second material, as indicated by the double-headed arrows on the right. This condition can be met even with loose tolerances on $d_0$, $d_1$ if the splitter is mounted on for example on a rotation stage.

Pulse broadening or chirp is proportional to the optical path length OP1 or OP2 and the second order derivative of the refractive index versus wavelength, if one assumes that the group velocity dispersion GVD1 or GVD2 can be approximated by the corresponding second order derivative. In order for the pulse splitter 5 to have an output at all its ports with the same broadening effect the following condition has to be fulfilled:

$$\frac{d_1}{\cos(\theta_1)} \frac{d^2 n_1}{d\lambda^2} = \frac{d_0}{\cos(\theta_0)} \frac{d^2 n_0}{d\lambda^2} \quad (3)$$

Given the known relation between $\theta_1$ and $\theta_0$, viz. Snell's law: $n_1 \sin(\theta_1) = n_0 \sin(\theta_0)$, and the value for $\cos(\theta_0)$ given in formula (2) above, one can derive a condition for the refractive indices:

$$n_1 \frac{d^2 n_1}{d\lambda^2} = n_0 \frac{d^2 n_0}{d\lambda^2} \quad (4)$$

The essence of this embodiment is a 4× pulse splitter as depicted in FIG. 3 where the refractive indices of the two layers differ substantially, but the product of refractive index and second order derivative are substantially the same. It is to be understood that for practical implementations, the equality need not be exactly full-filled, but nevertheless a range materials may be found that are useful for realizing the present invention.

Figure 4:
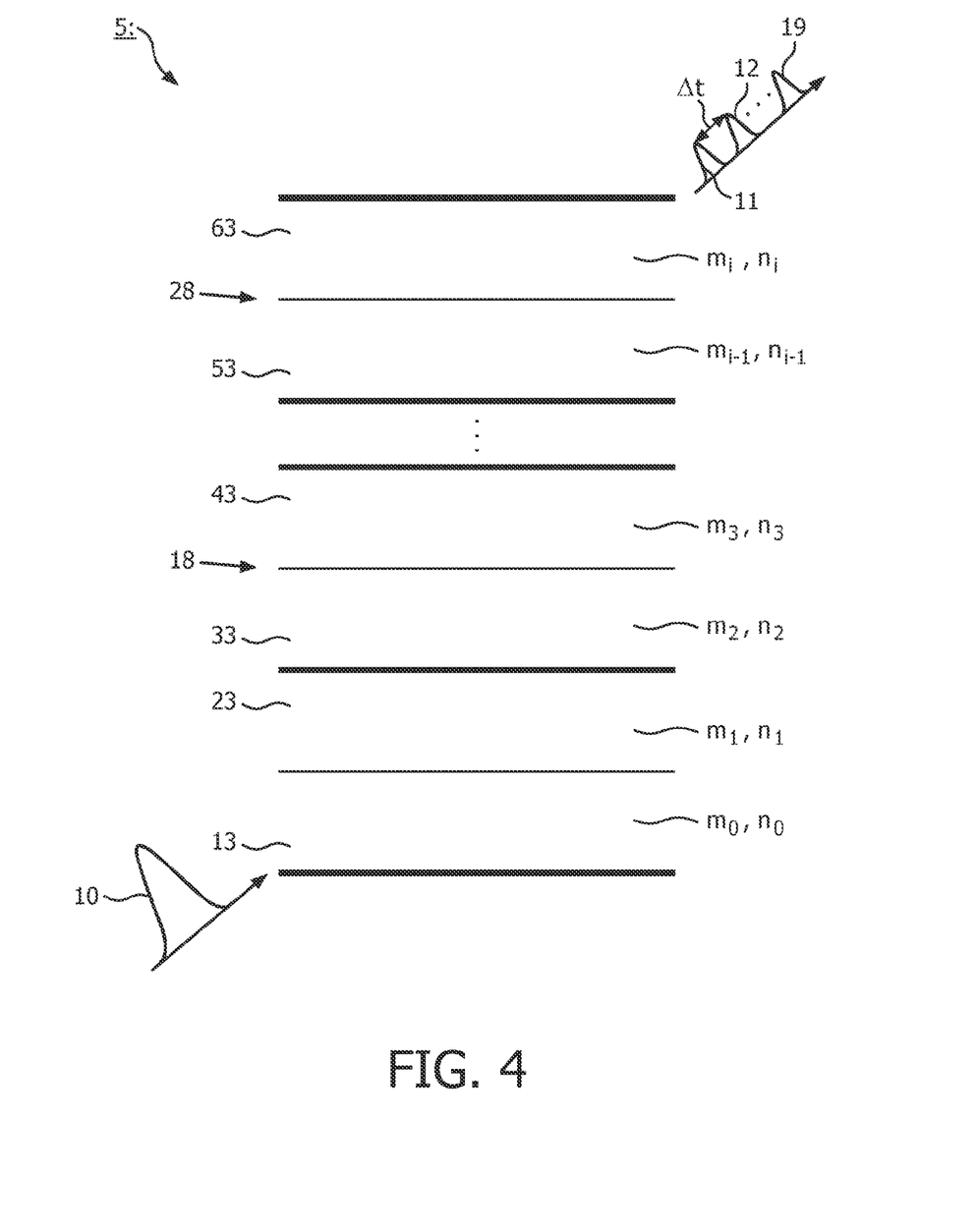
FIG. 4 is yet another schematic drawing of pulse splitting device according to the present invention showing a multitude of materials in a stacked configuration.

FIG. 4 is yet another schematic drawing of pulse splitting device according to the present invention showing a multitude of materials in a stacked configuration similar to the embodiment of FIG. 3, where the second region 23 has a third region 33 and fourth region 43 over layered on top of it. The set of materials 18 have refractive indices $n_2$ and $n_3$ chosen so as to implement yet another pulse splitting sub-device. Henceforth, materials set i-1 and i can be stacked in such a general configuration yielding N sub-pulses for every incoming pulse 10 schematically indicated by the sub-pulses 11, 12 and 19. Other optical configurations for obtaining a relatively high number of sub-pulses, N, from an incoming pulse may be found US patent application US 2009/0067458, cf. FIGS. 6 and 7 and the corresponding description, which is hereby incorporated by references in entirety.

Figure 5:
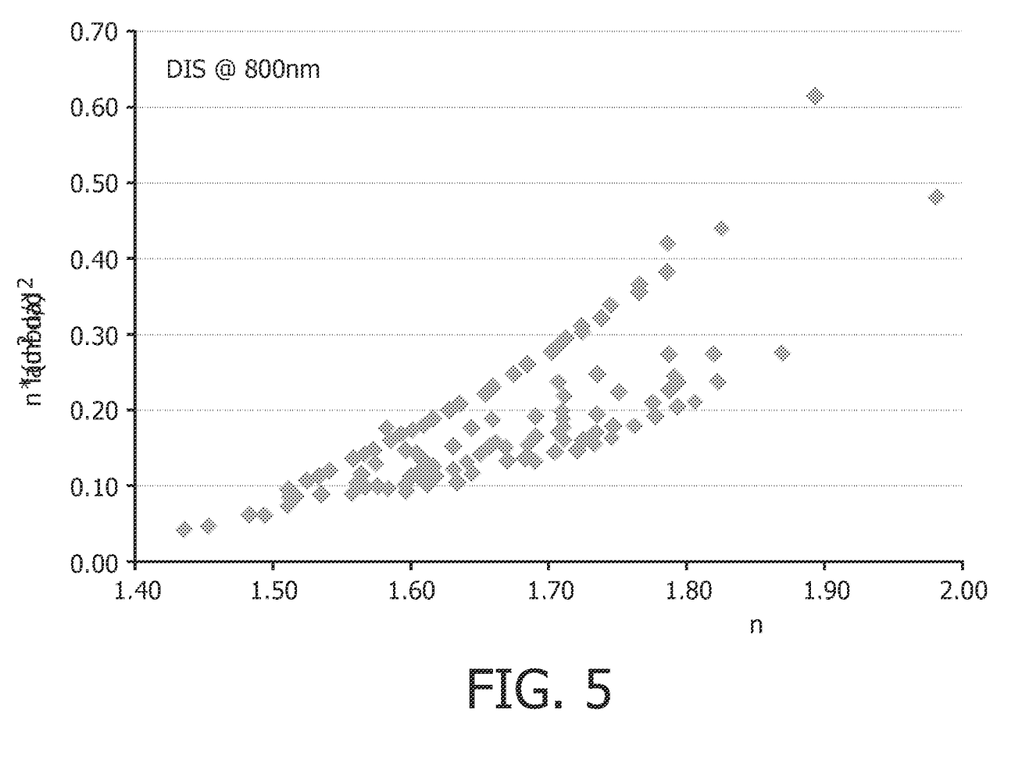
FIG. 5 is a graph suitable for finding pairs of materials to be applied in the present invention.

FIG. 5 is a graph suitable for finding pairs of materials to be applied in the present invention.

It is advantageous to use two different glass types for medium 1 and 0. Commonly, different glasses may be represented in a so-called Abbe diagram, or other suitable representation for finding set of materials.

The Abbe number is a relative difference of the refractive index at three wavelengths of Fraunhofer spectral lines. High dispersion glass means a low Abbe number en low dispersion glass means a high Abbe number. The condition for the 4× pulse splitter like the embodiment of FIG. 4 means that one would like to combine a glass type from the lower right corner of a Abbe diagram (low refractive index and high dispersion) with one of the upper left corner of the Abbe diagram (high refractive index and low dispersion). In order to make the condition for the dispersion more quantitative, one may plot the product of the refractive index and its second derivative versus the refractive index. The result for various glass types of the company Ohara is depicted in FIG. 5.

If one were to choose from the glass types of FIG. 5 for the pulse splitter 5 then one would optimize by choosing two glasses with the largest difference in refractive index, and which representing points lie on the same horizontal line in the graph. An example of such a set of glasses is the set:

S-LAH66 with n=1.761 and $nd^2n/d\lambda^2$=0.1796@800 nm
S-FTM16 with n=1.581 and $nd^2n/d\lambda^2$=0.1762@800 nm Obviously, the choice of materials is not restricted to this combination, nor needs one to take glasses from the same manufacturer nor is it obligatory to take two glasses—the materials could be any material which is transparent for the central wavelength involved.

Figure 6:
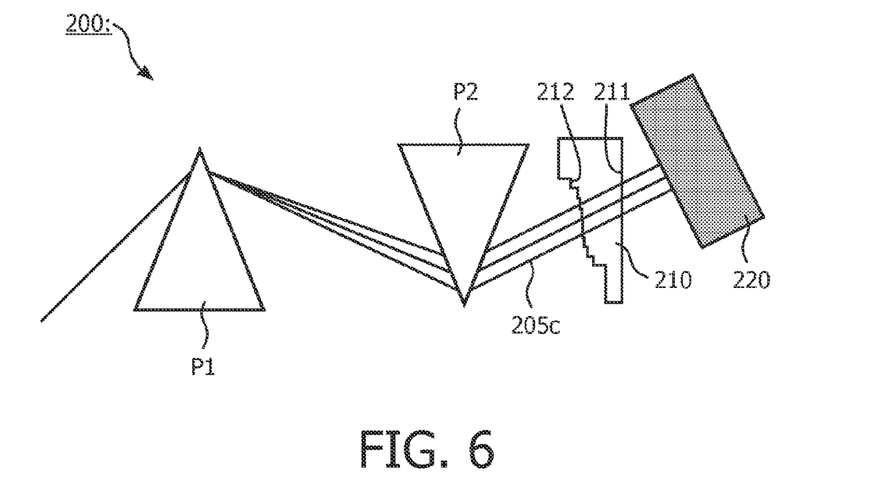
FIG. 6 is a schematic drawing of a dispersion compensation device useful for implementing with the present invention.

FIG. 6 is a schematic drawing of a dispersion compensation device useful for implementing with the present invention, cf. FIG. 1 where the compensation device may be implemented as the entity numbered 6. FIG. 6 is a schematic drawing of a dispersion compensation system 200 with a phase plate according to the present invention. The optical system 200 for compensating dispersion comprises a pair of optical components P1 and P2 arranged to compensate first-order dispersion by separating different wavelengths spatially. However, the first-order compensation can alternatively be accomplished by other optically equivalent elements i.e. a pair of gratings, each grating having a lens or curved mirror as it is well-known to a person skilled in optics, se e.g. R. L. Fork, C. H. Brito Cruz, P. C. Becker and C. V. Shank, "Compression of optical pulses to six femtoseconds using cubic phase compensation", Optics Letters 12(7) (1987) pp 483-485, which is hereby incorporated by reference in its entirety.

A higher-order dispersion compensation device 210 is introduced into the optical path, the compensation device having the form of a phase plate, wherein the phase change $\Delta\phi$ for each wavelength λ is adjusted by designing the height at the corresponding position of the plate 210 so as to substantially compensate for higher-order dispersion i.e. the terms $$\frac{1}{6}\frac{d^3\phi}{d\omega^3}\bigg|_{\omega_0}(\omega-\omega_0)^3 + \frac{1}{24}\frac{d^4\phi}{d\omega^4}\bigg|_{\omega_0}(\omega-\omega_0)^4$$

and further higher-order terms in the Taylor expansion of the phase φ.

The higher-order dispersion compensation device 210 is adapted to cooperate with the pair of optical components i.e. the prisms P1 and P2 by taking into account the optical properties O_Prop of the pair of optical components, i.e. the refractive index n of the prisms. Typically the two optical components are identical, or substantially identical, but this need not be the case always. The relative positions RP between the higher-order dispersion compensation device 210 and the pair of optical components P1 and P2 are also taken into account, though linear displacement of the device 210 along the optical path normally does not change the cooperation between the device 210 and the prisms. Needless to say, the actual wavelength of the incoming radiation should also to be taking into account. The device, in this cross-sectional view, has a substantially plane rear surface 211, and a front surface 212 with stepped heights.

Figure 7:
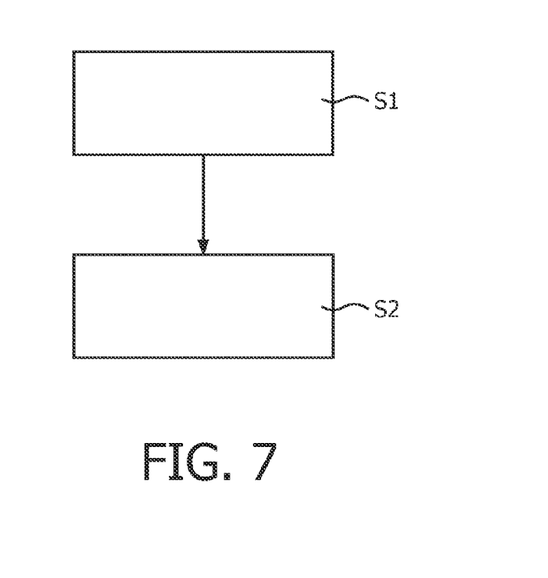
FIG. 7 is flow chart of a method according to the present invention.

FIG. 7 is flow chart of a method according to the present invention for performing optical imaging of an object, the method comprises:

S1 providing a pulse splitting device 5 adapted to receive irradiation pulses 10 with a central wavelength λ from a pulsed irradiation source 2 and output a plurality of sub-pulses 11, 12, 15 or 17 for each incoming irradiation pulse, the pulse splitter comprising a first region 13 with a first material $m_0$ having a first refractive index $n_0$, and a second region 23 with a second material $m_1$ having a second refractive index $n_1$; and S2 configuring the received irradiation pulses and the pulse splitter 5 for interacting so that at least a first and a second sub-pulse 11 and 12 are temporally separated by a first optical path length OP1 in the first region and a second optical path length OP2 in the second region, respectively, wherein the first optical path length OP1 times the group velocity dispersion GVD1 with respect to wavelength in the first material, is balanced with the second optical path length OP2 times the group velocity dispersion GVD2 with respect to wavelength in the second material, so that the dispersion broadening of the first and the second sub-pulses 11 and 12 is substantially equal.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A pulse splitting device (5) adapted to receive irradiation pulses (10) with a central wavelength ($\lambda$) from an associated pulsed irradiation source (2) and output a plurality of sub-pulses (11,12,15,17) for each incoming irradiation pulse, the pulse splitter comprising:
   a first region (13) with a first material ($m_0$) having a first refractive index ($n_0$), and
   a second region (23) with a second material ($m_1$) having a second refractive index ($n_1$);
   wherein the received irradiation pulses and the pulse splitter (5) are configured for interacting so that at least a first and a second sub-pulse (11,12) are temporally separated by a first optical path length (OP1) in the first region and a second optical path length (OP2) in the second region, respectively, and
   wherein the first optical path length (OP1) times the group velocity dispersion (GVD1) with respect to wavelength in the first material, is balanced with the second optical path length (OP2) times the group velocity dispersion (GVD2) with respect to wavelength in the second material, so that the dispersion broadening of the first and the second sub-pulses (11,12) is substantially equal.

2. The device according to claim 1, wherein the first (13) and the second (23) region comprises a common interface (9) formed by the first and the second material, where the first (OP1) and the second (OP2) optical path length is separated from each other by the common interface.

3. The device according to claim 2, wherein the common interface (9) is a substantially plane interface, the common interface being positioned between a pair of substantially parallel reflecting surfaces (25,35) arranged for reflecting the first and the second sub-pulse toward the common interface.

4. The device according to claim 1, wherein the group velocity dispersion with respect to wavelength in the first and/or the second material is approximated by the second derivate of the first and/or the second refractive index, respectively, at the central wavelength.

5. The device according to claim 3, wherein the dispersion broadening of the first and the second sub-pulses (11,12) is substantially equal by requiring that the equation $$n_1 \frac{d^2 n_1}{d\lambda^2} = n_0 \frac{d^2 n_0}{d\lambda^2}$$

is full-filled at the central wavelength ($\lambda$), where the first refractive index is $n_0$, and the second refractive index is $n_1$.

6. The device according to claim 1, wherein the dispersion broadening is substantially equal in a wavelength interval defined by a range of tunable central wavelengths of the associated irradiation source.

7. The device according to claim 1, wherein the first optical path length (OP1) times the group velocity dispersion with respect to wavelength in the first material, is balanced with the second optical path length (OP2) times the group velocity dispersion with respect to wavelength in the second material, so that the ratio of the broadest pulse width of the first and the second sub-pulses (11,12) with respect to the smallest pulse width of the first and the second sub-pulses is within a factor of 2, 1.6, 1.3 or 1.1.

8. An optical system (10) for imaging an object (8), the system comprising:
   a pulsed irradiation source (2) adapted to emit irradiation pulses with a central wavelength ($\lambda$),
   a pulse splitter (5) according to claim 1, and
   an optical detector (4) capable of detecting reflected radiation from the said object.

9. The optical system according to claim 8 further comprising a first dispersion compensation unit with a pair of optical components (P1, P2),
   and a higher-order dispersion compensation device (210), the device being adapted to cooperate with the pair of optical components (P1, P2) arranged to compensate first-order dispersion by separating different wavelengths spatially, the compensation device having the form of a phase plate, wherein the phase change for each wavelength is adjusted by designing the height at the corresponding position of the plate so as to substantially compensate for higher-order dispersion.

10. A method for performing optical imaging of an object, the method comprises:
   providing a pulse splitting device (5) adapted to receive irradiation pulses (10) with a central wavelength ($\lambda$) from a pulsed irradiation source (2) and output a plurality of sub-pulses (11,12,15,17) for each incoming irradiation pulse, the pulse splitter comprising
   a first region (13) with a first material ($m_0$) having a first refractive index ($n_0$), and a second region (23) with a second material ($m_1$) having a second refractive index ($n_1$); and
   configuring the received irradiation pulses and the pulse splitter (5) for interacting so that at least a first and a second sub-pulse (11,12) are temporally separated by a first optical path length (OP1) in the first region and a second optical path length (OP2) in the second region, respectively,
   wherein the first optical path length (OP1) times the group velocity dispersion (GVD1) with respect to wavelength in the first material, is balanced with the second optical path length (OP2) times the group velocity dispersion (GVD2) with respect to wavelength in the second material, so that the dispersion broadening of the first and the second sub-pulses (11,12) is substantially equal.

* * * * *